(12) United States Patent
Nikitin et al.

(10) Patent No.: US 10,452,968 B2
(45) Date of Patent: Oct. 22, 2019

(54) METHOD TO INCREASE RFID TAG SENSITIVITY

(71) Applicant: INTERMEC, INC., Lynnwood, WA (US)

(72) Inventors: Pavel Nikitin, Seattle, WA (US); Stephen J. Kelly, Seattle, WA (US); Rene Martinez, Seattle, WA (US)

(73) Assignee: INTERMEC, INC., Lynnwood, WA (US)

( * ) Notice: Subject to any disclaimer, the term of this patent is extended or adjusted under 35 U.S.C. 154(b) by 51 days.

(21) Appl. No.: 15/622,839

(22) Filed: Jun. 14, 2017

(65) Prior Publication Data

US 2018/0365549 A1    Dec. 20, 2018

(51) Int. Cl.
| | |
|---|---|
| *G06K 19/077* | (2006.01) |
| *G06K 7/00* | (2006.01) |
| *G06K 19/07* | (2006.01) |
| *G06K 7/10* | (2006.01) |
| *H01Q 1/22* | (2006.01) |
| *H01Q 1/24* | (2006.01) |
| *H01Q 15/00* | (2006.01) |

(52) U.S. Cl.
CPC ..... *G06K 19/07773* (2013.01); *G06K 7/0008* (2013.01); *G06K 7/10158* (2013.01); *G06K 19/0723* (2013.01); *H01Q 1/2225* (2013.01); *H01Q 1/248* (2013.01); *H01Q 15/0006* (2013.01)

(58) Field of Classification Search
USPC .......................................................... 235/487
See application file for complete search history.

(56) References Cited

U.S. PATENT DOCUMENTS

| | | |
|---|---|---|
| 5,649,295 A | 7/1997 | Shober et al. |
| 6,243,013 B1 * | 6/2001 | Duan ................. G06K 19/0701 340/572.7 |
| 6,265,962 B1 | 7/2001 | Black et al. |
| 6,456,668 B1 | 9/2002 | MacLellan et al. |
| 6,802,659 B2 | 10/2004 | Cremon et al. |
| 7,232,069 B1 | 6/2007 | White |
| 7,304,579 B2 | 12/2007 | Diorio et al. |
| 7,525,438 B2 | 4/2009 | Hyde et al. |

(Continued)

OTHER PUBLICATIONS

Nikitin et al; "UHF RFID Tag Characterization: Overview and State-of-the-Art;" AMTA Conference, Seattle, Washington; Oct. 2012; 6 pp.

(Continued)

*Primary Examiner* — Michael G Lee
*Assistant Examiner* — David Tardif
(74) *Attorney, Agent, or Firm* — Oliff PLC; R. Brian Drozd

(57) ABSTRACT

A radio-frequency identification (RFID) tag with improved sensitivity includes an antenna that receives a radio-frequency (RF) signal and wireless power from an RFID reader. The RFID tag further includes a circuit that varies a reflection coefficient of the antenna to transmit a reflected signal to the reader, the reflected signal having periods of high reflectance when a relatively high amount of the RF signal is reflected, and low reflectance periods when a relatively low amount of the RF signal is reflected. The reflectance of the antenna is sufficiently low during the high reflectance periods to enable wireless power reception during the high reflectance periods.

20 Claims, 3 Drawing Sheets

(56) References Cited

U.S. PATENT DOCUMENTS

| | | |
|---|---|---|
| 7,952,464 B2 | 5/2011 | Nikitin et al. |
| 8,207,828 B2 | 6/2012 | Hanebeck |
| 8,253,539 B2 | 8/2012 | Scaramozzino |
| 8,258,920 B2 | 9/2012 | Crucs |
| 8,416,079 B2 | 4/2013 | Roesner |
| 8,564,412 B2 | 10/2013 | Nikitin et al. |
| 8,610,539 B2 | 12/2013 | Solomon |
| 8,947,214 B2 | 2/2015 | Solomon |
| 9,055,798 B2 | 6/2015 | Scicluna |
| 9,082,057 B2 | 7/2015 | McGregor |
| 9,165,170 B1 | 10/2015 | Gutnik et al. |
| 9,317,729 B2 | 4/2016 | Krusor et al. |
| 9,514,402 B1 | 12/2016 | Kim et al. |
| 2004/0263319 A1 | 12/2004 | Huomo |
| 2005/0052279 A1 | 3/2005 | Bridgelall |
| 2005/0237198 A1 | 10/2005 | Waldner et al. |
| 2006/0133175 A1 | 6/2006 | Gutnik et al. |
| 2006/0163370 A1 | 7/2006 | Diorio et al. |
| 2007/0194914 A1 | 8/2007 | Gates |
| 2007/0200681 A1 | 8/2007 | Colby |
| 2008/0303633 A1 | 12/2008 | Cheng et al. |
| 2009/0015407 A1 | 1/2009 | Tuttle |
| 2009/0094410 A1 | 4/2009 | Kari et al. |
| 2010/0123581 A1 | 5/2010 | Hatfield et al. |
| 2011/0140537 A1 | 6/2011 | Takei |
| 2011/0205026 A1 | 8/2011 | Bateman |
| 2012/0083205 A1 | 4/2012 | Marcu et al. |
| 2012/0211560 A1 | 8/2012 | Su et al. |
| 2013/0181815 A1* | 7/2013 | Wang ............... G06K 19/07773 340/10.1 |
| 2013/0201000 A1 | 8/2013 | Solomon |
| 2013/0241779 A1* | 9/2013 | Korva .................... H01Q 1/243 343/700 MS |
| 2014/0001876 A1 | 1/2014 | Fujiwara et al. |
| 2014/0016719 A1 | 1/2014 | Manku |
| 2014/0033289 A1 | 1/2014 | Solomon |
| 2014/0045425 A1 | 2/2014 | Roh et al. |
| 2014/0176307 A1 | 6/2014 | Forster |
| 2015/0379459 A1 | 12/2015 | Russell et al. |
| 2016/0364642 A1 | 12/2016 | Viala et al. |

OTHER PUBLICATIONS

Nikitin et al; "Effect of Gen2 Protocol Parameters on RFID Tag Performance;" IEEE RFID Conference, Orlando, Florida; Apr. 2009; 6 pp.

Pillai et al; "A Technique for Simultaneous Multiple Tag Identification;" IEEE Workshop on Automatic Identification Advanced Technologies; Oct. 2005; pp. 35-38.

Nikitin et al; "Differential RCS of RFID tag;" Electronics Letters; Apr. 12, 2007; vol. 43; No. 8; 2 pp.

Nikitin et al; "Power Reflection Coefficient Analysis for Complex Impedances in RFID Tag Design;" IEEE Transactions on Microwave Theory and Techniques; Sep. 9, 2005; vol. 53; No. 9; pp. 2721-2725.

D'Orazio; "Pitt researchers' NFC and RFID cards feature a touch-sensitive on/off switch;" The Verge; Feb. 19, 2012; retrieved from http://www.theverge.com/2012/2/19/2809205/nfc-rfid-credit-card-on-off-switch.

"UCODE;" May 21, 2015; retreived from http://www.nxp.com/products/identification-and-security/smart-label-and-tag-ics/ucode:MC_50483.

U.S. Appl. No. 15/343,553, filed Nov. 4, 2016 in the name of Nikitin et al.

Jun. 15, 2017 Office Action issued in U.S. Appl. No. 15/343,553.

U.S. Appl. No. 15/637,520, filed Jun. 29, 2017 in the name of Nikitin et al.

Jan. 8, 2018 Notice of Allowance issued in U.S. Appl. No. 15/343,553.

Mar. 27, 2018 Office Action issued in U.S. Appl. No. 15/637,520.

Oct. 25, 2018 Search Report issued in European Patent Application No. 18177629.5.

Nov. 1, 2018 Office Action issued in U.S. Appl. No. 15/637,520.

\* cited by examiner

METHOD TO INCREASE RFID TAG SENSITIVITY

BACKGROUND

Passive Radio-Frequency Identification (RFID) tags typically consist of an integrated circuit (IC) connected to an antenna. The IC is often a low power device, powered purely by RF energy harvested from the reader signal. The tag responds to the reader by varying its input impedance (and reflectance) and thus modulating the backscattered signal.

In RFID systems, both forward (reader-to-tag) and reverse (tag-to-reader) links are important. Current passive CMOS RFID ICs are approaching the fundamental limits of their turn-on sensitivity, dictated by diode-based voltage multiplier limits of RF-to-DC power conversion. The best ICs currently have sensitivity of about −20 dBm which has been reached for several years and no further sensitivity improvement is expected.

Often the overall system performance is limited by the tag sensitivity; in other words, the tag is the weakest link in the communication system. For many applications, such as for tag reading in indoor multi-tag multipath scenarios, or AVI tolling applications, better passive tag sensitivity is desired. Every dB of improvement in tag sensitivity results in measurable system performance improvement, e.g. in the useable range of the tag.

In the past, improvements to tag sensitivity and range have been attempted. One such solution proposes a tag which can combine voltages from two ports of orthogonal dipole antennas to gain more tag sensitivity but requires a large cross-dipole tag and the presence of circularly polarized reader signal in order to extract power from both polarizations. Another solution is to eschew a passive tag design for a powered tag design, or to sacrifice bandwidth. These solutions increase the size of the tag and/or require battery replacement, often rendering them unsuitable for their target applications. Sacrificing bandwidth is also unacceptable in many applications.

Traditionally, the tag transmission performance has been viewed as paramount. The prevailing belief is that a reduction in tag transmission performance would reduce the range of the tag. Thus, solutions that improve tag range by sacrificing tag transmission performance have not been explored.

SUMMARY

A radio-frequency identification (RFID) tag includes a main antenna that receives a radio-frequency (RF) signal from an RFID reader and wirelessly harvests power from the RF signal. The tag further includes a switch connected to the main antenna and a separate length of antenna. The tag further includes a circuit connected to a different portion of the main antenna than the switch. The circuit is configured to vary a reflection coefficient of the main antenna to transmit a reflected signal to the RFID reader, the reflected signal having high reflectance periods when an amount of reflectance by the main antenna of the RF signal is greater than a predetermined amount, and low reflectance periods when an amount of reflectance by the main antenna of the RF signal is lower than the predetermined amount. The circuit is further configured to reduce the reflectance of the main antenna below a predefined amount during the high reflectance periods to enable wireless power reception during the high reflectance periods by changing a resonant frequency of the main antenna to generate the high reflectance periods and low reflectance periods. The circuit is further configured to change the resonant frequency by controlling the switch to intermittently connect the separate length of antenna to the main antenna.

A radio-frequency identification (RFID) tag includes a main antenna that receives a radio-frequency (RF) signal from an RFID reader and wirelessly harvests power from the RF signal. The tag further includes a circuit that is configured to vary a reflection coefficient of the main antenna to transmit a reflected signal to the RFID reader, the reflected signal having high reflectance periods when an amount of reflectance by the main antenna of the RF signal is greater than a predetermined amount, and low reflectance periods when an amount of reflectance by the main antenna of the RF signal is lower than the predetermined amount. The circuit increases a duty cycle of the low reflectance periods and decreases a duty cycle of the high reflectance periods to increase a time period of wireless power transmission.

A radio-frequency identification (RFID) tag includes a main antenna that receives a radio-frequency (RF) signal from an RFID reader and wirelessly harvests power from the RF signal. The tag further includes a circuit that is configured to vary a reflection coefficient of the main antenna to transmit a reflected signal to the RFID reader, the reflected signal having first reflectance periods, and second reflectance periods when an amount of reflectance by the main antenna of the RF signal is different than during the first reflectance periods. The main antenna continuously harvests power while transmitting the reflected signal to the RFID reader.

In some embodiments, the circuit changes a resonant frequency of the antenna to generate the high reflectance periods and low reflectance periods. In some embodiments, the circuit changes a resonant frequency of the antenna to generate the first reflectance periods and second reflectance periods. In some embodiments, the circuit adds a separate length of antenna to the antenna during the high reflectance periods. In some embodiments, the circuit adds a separate length of antenna to the antenna during the first reflectance periods. In some embodiments, the RFID tag further includes a switch that adds the length of antenna by connecting the length of antenna to the antenna during the high reflectance periods, the switch being located on a different portion of the antenna than the circuit. In some embodiments, the RFID tag further includes a switch that adds the length of antenna by connecting the length of antenna to the antenna during the first reflectance periods, the switch being located on a different portion of the antenna than the circuit. In some embodiments, the antenna includes a first antenna for receiving the RF signal, and a second antenna for receiving power, and the second antenna continues to absorb a portion of the RF signal during the high reflectance periods to generate a sufficiently low reflectance to enable wireless power harvesting during the high reflectance periods. In some embodiments, the antenna includes a first antenna for receiving the RF signal, and a second antenna for receiving power, and the second antenna continues to absorb a portion of the RF signal during the first and second reflectance periods to generate a sufficiently low reflectance to enable wireless power harvesting during both the first and second reflectance periods. In some embodiments, the RFID tag further includes a switch controlled by the circuit that connects an RF impedance to the antenna during the high reflectance periods. In some embodiments, the RFID tag further includes a switch controlled by the circuit that connects an RF impedance to the antenna during the first reflectance periods. In some embodiments, the antenna has a reflection coefficient magnitude of 0.5 during the high reflectance periods, and a reflection coefficient of zero during the low reflectance periods. In some embodiments, the predetermined amount is a reflection coefficient magnitude of between 0 and 0.5. In some embodiments, the amount of reflectance by the main antenna of the RF signal is greater than a predetermined amount during the first reflectance periods, the amount of reflectance by the main antenna of the RF signal is lower than the predetermined amount during the second reflectance periods, and the circuit reduces the reflectance of the main antenna below a predefined amount during the first reflectance periods to enable wireless power reception during the first reflectance periods. In some embodiments, the amount of reflectance of by the main antenna of the RF signal during the first reflectance periods is of equal magnitude but opposite polarity to the amount of reflectance of by the main antenna of the RF signal during the second reflectance periods. In some embodiments, the circuit is an application-specific integrated circuit (ASIC). In some embodiments, the antenna is a linearly polarized antenna. In some embodiments, the circuit increases the duty cycle of the low reflectance period to greater than 50%.

DETAILED DESCRIPTION OF EMBODIMENTS

Figure 1:
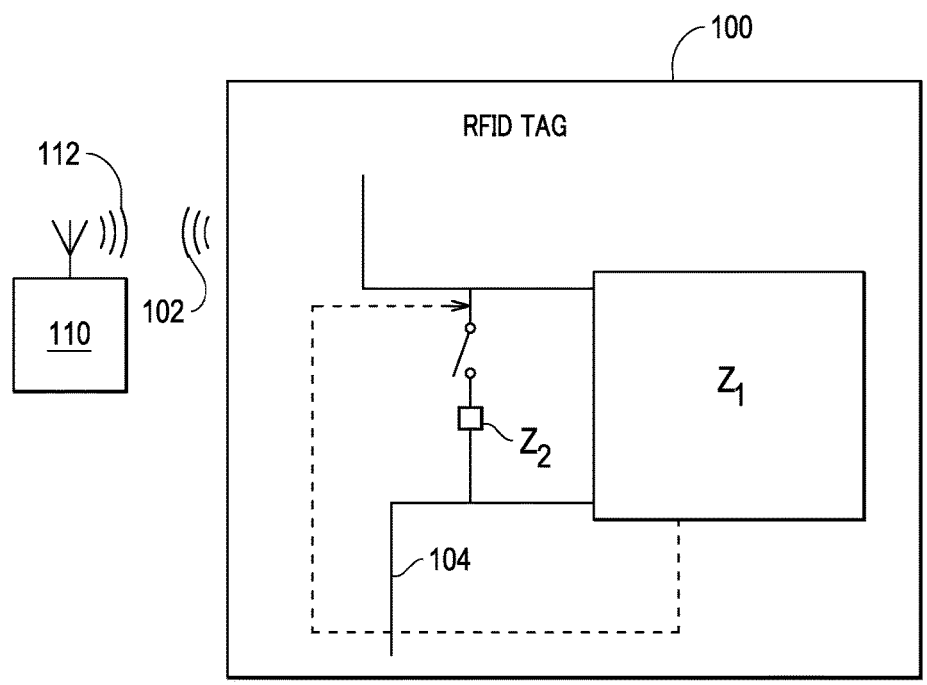
FIG. 1 is a diagram of an RFID tag according to one embodiment and communicating with an RFID reader.

The RFID tag 100 according to some embodiments communicates with the reader 110 by backscattering a reader signal 112 to produce a reflected signal 102 (the signal transmitted from RFID tag 100 to reader 110) using its antenna 104. RFID tag 100 simultaneously communicates with reader 110 and receives power transmission from the reader signal 112. When an RFID tag 100 backscatters (talks to the reader 110), it switches between two reflectance states. One reflectance state is power harvesting. Another reflectance state is close to a short-circuit, in order to provide maximum backscattered signal to the reader 110. In this embodiment, $z_1$ is an integrated circuit controlling a switch to selectively connect impedance $z_2$ to antenna 104 and vary the antenna impedance to generate reflected signal 102. As discussed in the Background, this signal is designed to have the maximum strength to maximize the range of the tag 100.

Figure 2:
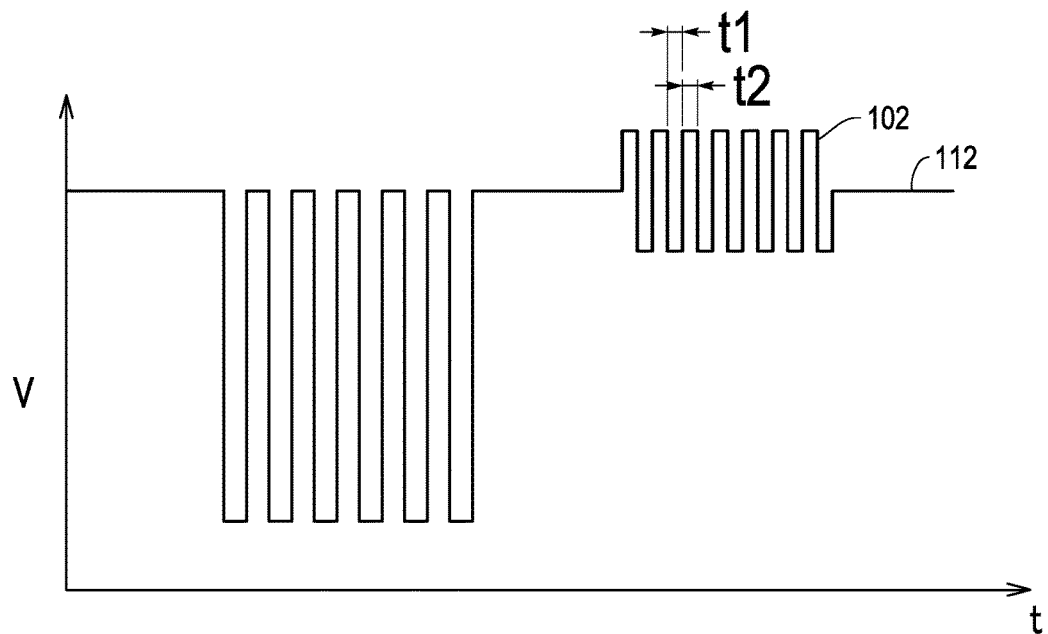
FIG. 2 is a waveform of a signal transmitted from the RFID tag according to one embodiment to the reader.

As a result, the tag shorts (or approximately shorts) its antenna port (and hence its RF power supply) approximately 50% of the time (duty cycle of a typical tag-to-reader data signal), thus losing up to 3 dB of the incoming RF power (the tag IC cannot harvest RF power when the input terminals are shorted). FIG. 2 shows waveforms of reader signal 112 and backscatter signal 102. As shown in FIG. 2, the duty cycle of the backscatter signal 102 is approximately 50%. In other words $t_1=t_2$, where $t_1$ is the length of the OFF time (low reflectance period) for each period of the signal and $t_2$ is the length of ON time (high reflectance period) for each period. In some embodiments the length of $t_2$ could be shortened and the length of $t_1$ lengthened by altering the duty cycle. This increases the power reception of the RFID tag by increasing the portion of the communication time where power is received.

Modern RFID tags still follow this backscattering scheme, even though modern RFID readers are much more sensitive than they used to be and can successfully detect and decode weak tag signals. The result is that at the fringes of the tag range, the tag will intermittently lose power while attempting to communicate with the reader. This results in failed communication with the reader and shrinks the useable range of tag transmission.

Figure 3:
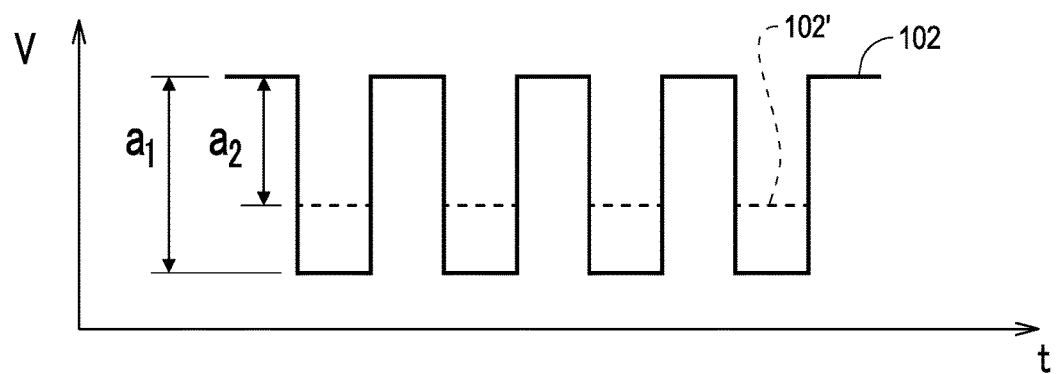
FIG. 3 is a waveform of a signal transmitted from the RFID tag according to one embodiment to the reader.

The inventors have determined several embodiments that counter the basic assumptions in the art and sacrifice tag transmission performance in order to increase its range. Accordingly, several embodiments described herein sacrifice backscatter signal strength in order to provide additional received power to the tag 100. FIG. 3 shows how the amplitude $a_1$ or depth of backscatter 102 is reduced to $a_2$ in order to increase charging of the RFID tag 100. This allows for steady transmission of a (weakened) signal 102' at the fringes of the tag range, which modern readers are able to read. Instead of the antenna 104 reflecting substantially all of the signal and substantially none of the signal during different transmission periods, antenna 104 has periods of relatively high reflectance and relatively low reflectance. In other words, in the periods of high reflectance, the antenna has reflectance higher than a predetermined amount, and in the periods of low reflectance, the antenna has reflectance lower than a predetermined amount. In several embodiments the predetermined amount is a reflection coefficient magnitude of 0 to 0.5. This results from some of signal 102 being absorbed during the (relatively high reflectance) period when substantially all of the signal 102 would normally be reflected. The relatively low reflectance period has a lower reflectance than the high reflectance period, and the alternation between these two different periods generates signal 102'. In other embodiments, there are first and second reflectance periods with equal amounts of reflectance and opposite polarities. In those embodiments, power is still harvested during both periods.

This expands the useable range of the tag, by allowing the antenna to continuously harvest power while transmitting the reflected signal 102'. Several embodiments use existing CMOS integrated circuits, and can nevertheless have significant sensitivity improvement (e.g. 3 dB). A 3 dB improvement in tag sensitivity corresponds to 40% more tag range in free space. According to several embodiments of the tag, backscattered signal strength is sacrificed in order to gain more power efficiency during tag modulation and hence more tag sensitivity and more tag range.

As a result, when such tag 100 backscatters, it will not be fully shorting its receiving antenna port and thus will have additional received RF power available (e.g. 3 dB more). For example, when signal strength is sacrificed by 6 dB in certain embodiments, 2.43 dB of tag sensitivity is gained, as explained in the following equations (1)-(4) and Table 1. The reflection coefficient ρ is described according to equation (1).

$$\rho_i = (z_i - z_a^*)/(z_i - z_a^*), \qquad (1)$$

where $z_a$ is the antenna impedance.

Each state also has power coefficient $\tau_i$, defined by:

$$\tau_i = 1 - |\rho_i|^2 \quad (2)$$

Power efficiency of the tag can be described by:

$$P_e = \frac{1}{2}\tau_1 \pm \frac{1}{2}\tau_2, \quad (3)$$

where the signal duty ratio is 50%.

Modulation depth of the backscattered signal can be described by:

$$K = \frac{1}{4}|\rho_1 - \rho_2|^2 \quad (4)$$

Equation 5 defines α, which is between zero and 1

$$\alpha = |\rho_2| \quad (5)$$

TABLE 1

| α | K | $\tau_2$ | $P_e$ |
|---|---|---|---|
| 0 | 0 | 1 | 1 (0 dB) |
| ½ | 1/16 (−12 dB) | ½ | 0.875 (−0.56 dB) |
| 1 | ¼ | 0 | ½ (−3 dB) |

In Table 1, the antenna with α=0 is impractical because it has zero backscatter. The antenna with α=1 is a conventional antenna. The antenna with α=½ is an antenna according to one embodiment. In this antenna, $P_e$ is improved by 2.33 dB and has a 30% increase in range. K is reduced by 6 dB.

The tags described herein can take the sensitivity of passive RFID tags beyond what current CMOS integrated circuits are capable of and thus be important for many practical RFID applications, such as automotive vehicle identification and tolling applications. One of the significant advantages of several embodiments is that they work with linearly polarized reader signals and linearly polarized tags, prevailing on RFID market.

Figure 4:
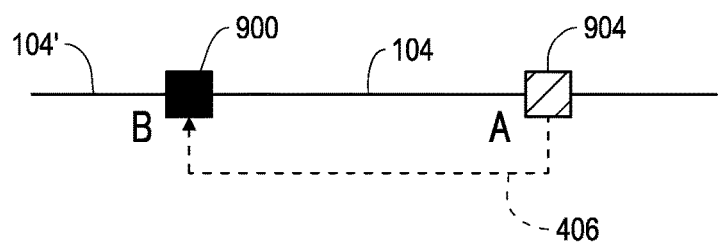
FIG. 4 is a schematic of the RFID tag according to one embodiment.
Figure 5:
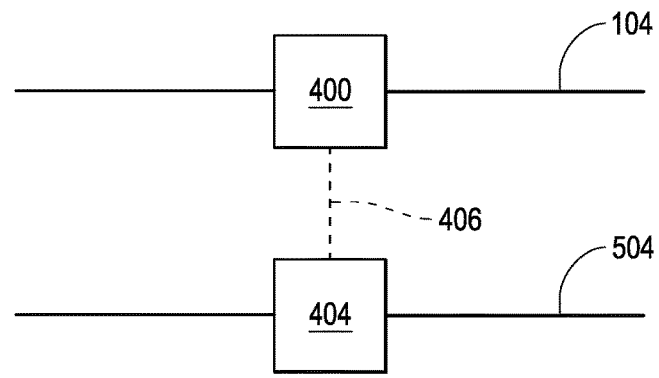
FIG. 5 is a schematic of the RFID tag according to one embodiment.

The RFID tag 100 can be implemented in several different ways, including:

1. Physical—reduced backscatter signal strength and increased tag power efficiency are achieved via spatial separation of receiving 904 and backscattering 900 ports/points on the tag antenna using control line 406. A shared antenna 104 can have a modulator A that only slightly changes antenna resonant frequency (by engaging/disengaging extra antenna length 104'), allowing one to maintain a high received power efficiency during tag modulation cycle, but still providing a detectable differential backscattered signal to the reader, as illustrated in FIG. 4. Another implementation of this method can be two separate antennas 104, 504 that are used for receiving power and backscattering as shown in FIG. 5.

Figure 6:
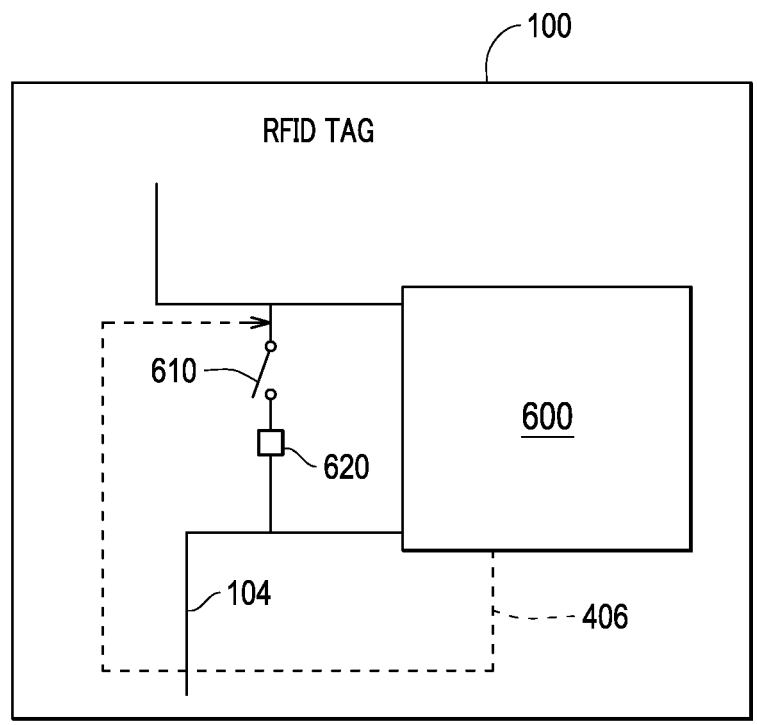
FIG. 6 is a schematic of the RFID tag according to one embodiment.
Figure 7:
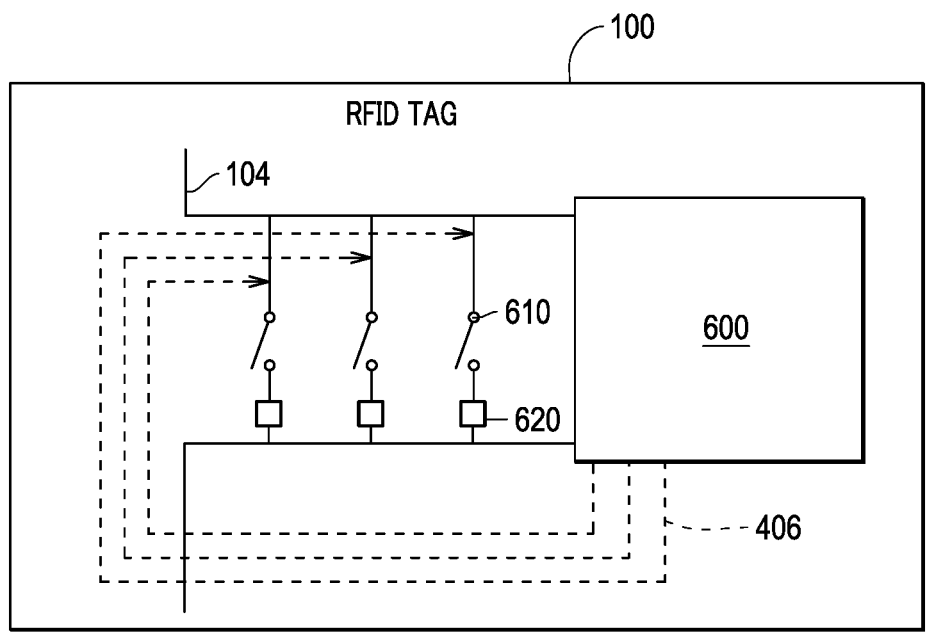
FIG. 7 is a schematic of the RFID tag according to one embodiment.

2. Electrical—reduced backscatter signal strength and increased tag power efficiency are achieved and controlled via choosing a different modulating impedance within tag circuitry. These embodiments are shown in FIGS. 6 and 7. In these embodiments, an ASIC or processor 600 controls one or more switches 610 to add or subtract one or more impedances 620 from antenna 104. This changes the resonant frequency and reflectance properties without shorting the antenna 104. As a result, a measureable signal 102' is sent from tag 100 to reader 110, and power reception is maintained throughout transmission.

According to the embodiments shown in FIGS. 4 and 6, the antenna 104 is linearly polarized. Antenna 104 in these embodiments has a separate receive port 904 and backscatter port 900. An RFID integrated circuit (IC; an ASIC or processor in some embodiments) A, 600 is connected to the receive port 904, and a switch B, 610 (a MOSFET is some embodiments) is attached to backscatter port 900. The RFID integrated circuit A, 600 controls the switch B, 610 to add or subtract a portion 104' of antenna 104 in order to generate the reduced backscatter signal 102'. By adding and subtracting portion 104', the resonant frequency of the antenna 104 is not changed too drastically, and the antenna 104 receives power in both the on and off portions of the duty cycle (i.e. high reflectance and low reflectance periods or vice versa). In this embodiment, RFID integrated circuit A, 600 and switch B, 610 share the same antenna 104 and have common electrical ground (portion of the antenna between the ASIC and the modulator). In some embodiments, switch B, 610 is implemented using a PIN diode. Many more frequency reconfigurable antennas (such as slot antennas) could be used to achieve a similar effect.

Although the invention has been described with reference to embodiments herein, those embodiments do not limit the scope of the invention. Modifications to those embodiments or different embodiments may fall within the scope of the invention.

What is claimed is:

1. A radio-frequency identification (RFID) tag comprising:
   a main antenna that receives a radio-frequency (RF) signal from an RFID reader and wirelessly harvests power from the RF signal;
   a switch connected to a first portion of the main antenna and a separate length of antenna; and
   a circuit connected to a second portion of the main antenna, wherein the second portion of the main antenna is different than the first portion of the main antenna, the circuit being configured to:
   vary a reflection coefficient of the main antenna to transmit a reflected signal to the RFID reader, the reflected signal having high reflectance periods when an amount of reflectance by the main antenna of the RF signal is greater than a predetermined amount, and low reflectance periods when an amount of reflectance by the main antenna of the RF signal is lower than the predetermined amount;
   control the switch to intermittently connect the separate length of antenna to the main antenna;
   change a resonant frequency of the main antenna, based on the controlled switching, to generate a high reflectance period and a low reflectance period; and
   reduce a reflectance of the main antenna below a predefined amount during the high reflectance period without shorting the main antenna to enable the main antenna for continuous wireless power harvesting while transmitting the reflected signal to the RFID reader, wherein the reflectance of the main antenna during the high reflectance period is reduced based on the change in the resonant frequency of the main antenna.

2. The RFID tag of claim 1, wherein the predetermined amount is a reflection coefficient magnitude of between 0 and 0.5.

3. The RFID tag of claim 1, wherein the predefined amount is a reflection coefficient magnitude of 0.5.

4. The RFID tag of claim 1, wherein the circuit is an application-specific integrated circuit (ASIC).

5. The RFID tag of claim 1, wherein the main antenna is a linearly polarized antenna.

6. A radio-frequency identification (RFID) tag comprising:

a main antenna that receives a radio-frequency (RF) signal from an RFID reader and wirelessly harvests power from the RF signal; and a circuit that is configured to vary a reflection coefficient of the main antenna to transmit a reflected signal to the RFID reader, the reflected signal having a high reflectance period when an amount of reflectance by the main antenna of the RF signal is greater than a predetermined amount, and a low reflectance period when an amount of reflectance by the main antenna of the RF signal is lower than the predetermined amount, wherein a reflectance of the main antenna is reduced below a predefined amount during the high reflectance period without shorting the main antenna to enable the main antenna for continuous wireless power harvesting while transmitting the reflected signal to the RFID reader, wherein the reflectance of the main antenna during the high reflectance period is reduced based on a change in a resonant frequency of the main antenna, wherein the circuit increases a duty cycle of the low reflectance periods and decreases a duty cycle of the high reflectance periods to increase a time period of wireless power transmission.

7. The RFID tag of claim 6, wherein the predetermined amount is a reflection coefficient magnitude of between 0 and 1.

8. The RFID tag of claim 6, wherein the circuit increases the duty cycle of the low reflectance periods to greater than 50%.

9. The RFID tag of claim 6, wherein the circuit is an application-specific integrated circuit (ASIC).

10. The RFID tag of claim 6, wherein the main antenna is a linearly polarized antenna.

11. A radio-frequency identification (RFID) tag comprising:

a main antenna that receives a radio-frequency (RF) signal from an RFID reader and wirelessly harvests power from the RF signal; and a circuit that is configured to vary a reflection coefficient of the main antenna to transmit a reflected signal to the RFID reader, the reflected signal having a first reflectance period and a second reflectance period when an amount of reflectance by the main antenna of the RF signal is different than during the first reflectance period, wherein a reflectance of the main antenna is reduced below a predefined amount during the first reflectance period without shorting the main antenna to enable the main antenna to continuously harvest power while transmitting the reflected signal to the RFID reader, wherein the reflectance of the main antenna is reduced based on a change in a resonant frequency of the main antenna.

12. The RFID tag of claim 11, wherein the circuit changes the resonant frequency of the main antenna to generate the first and second reflectance period.

13. The RFID tag of claim 12, wherein the circuit adds a separate length of antenna to the main antenna during the first reflectance period.

14. The RFID tag of claim 13, further comprising:

a switch that adds the separate length of antenna by connecting the separate length of antenna to the main antenna during the first reflectance period, the switch being located on a first portion of the main antenna and the circuit being located on a second portion of the main antenna, wherein the first portion of the main antenna is different than the second portion of the main antenna.

15. The RFID tag of claim 11, wherein the main antenna includes a first antenna for receiving the RF signal, and a second antenna for receiving power, and the second antenna continues to absorb a portion of the RF signal during the first reflectance period and the second reflectance period to generate a low reflectance to enable wireless power harvesting during both the first reflectance period and the second reflectance period.

16. The RFID tag of claim 11, further comprising:

a switch controlled by the circuit that connects an RF impedance to the main antenna during the first reflectance period.

17. The RFID tag of claim 11, wherein the amount of reflectance by the main antenna of the RF signal is greater than the predetermined amount during the first reflectance period, and the amount of reflectance by the main antenna of the RF signal is lower than the predetermined amount during the second reflectance period.

18. The RFID tag of claim 11, wherein the amount of reflectance of the main antenna of the RF signal during the first reflectance period is of greater magnitude to the amount of reflectance of the main antenna of the RF signal during the second reflectance period.

19. The RFID tag of claim 11, wherein the circuit is an application-specific integrated circuit (ASIC).

20. The RFID tag of claim 11, wherein the main antenna is a linearly polarized antenna.

* * * * *